3,531,018
METHOD FOR CONTINUOUSLY PROVIDING TWO DIFFERENT LIQUIDS IN METERED AMOUNTS
Roland Richterich, Bern, Switzerland, assignor to Hoffmann-La Roche Inc., Nutley, N.J., a corporation of New Jersey
Filed Dec. 5, 1968, Ser. No. 781,335
Claims priority, application Switzerland, Dec. 15, 1967, 17,639/67
Int. Cl. B67d 5/48
U.S. Cl. 222—1                    2 Claims

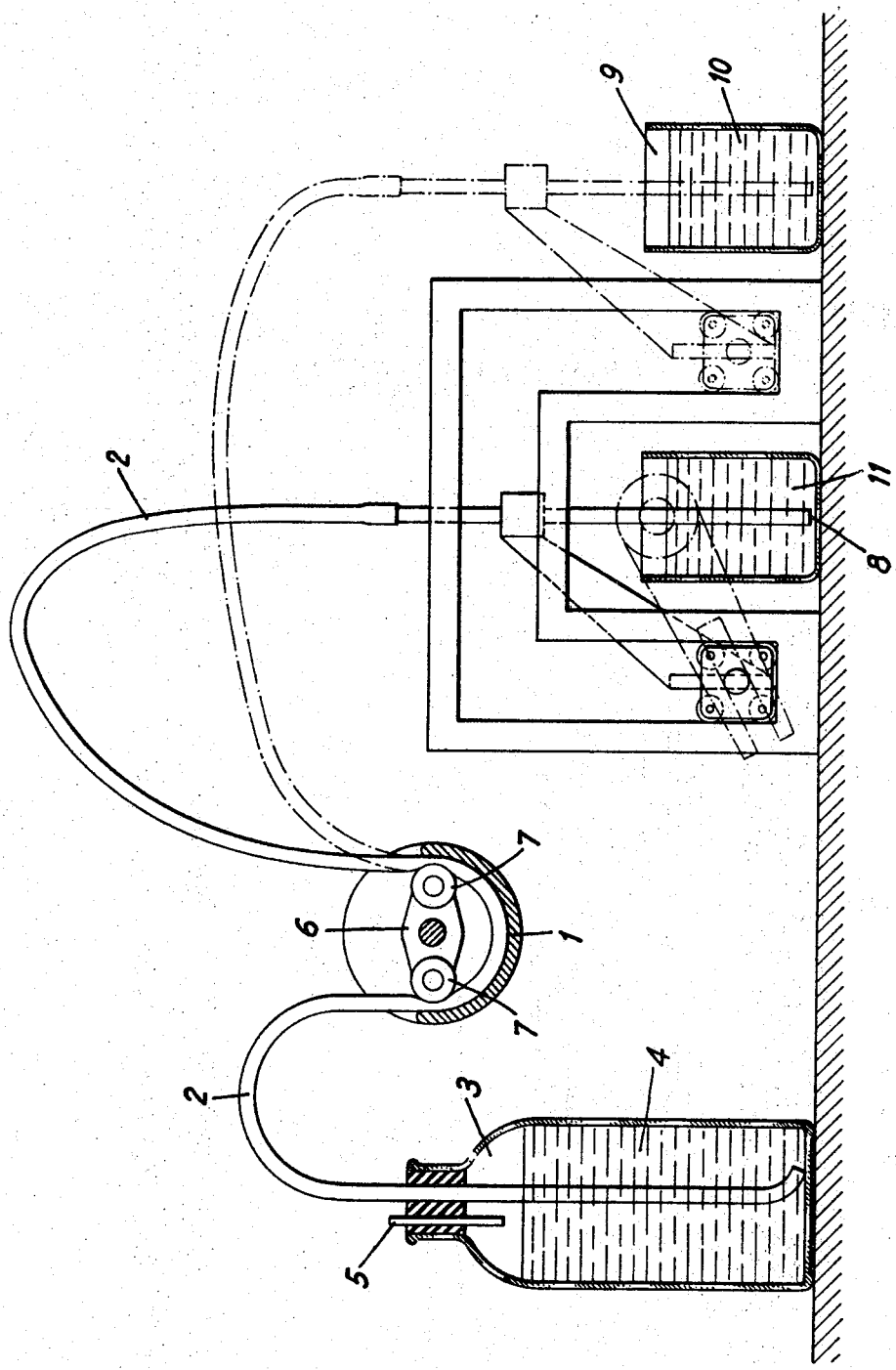

ABSTRACT OF THE DISCLOSURE

The second liquid is sucked into the hose until the latter is filled to its free end, which is then submerged into the first liquid, which is drawn into the hose; the first liquid is expelled into a container while the hose sucks up the second liquid, which is also expelled into the container once the hose is emptied of the first liquid.

BACKGROUND OF THE INVENTION

The invention relates to a method for continuously providing metered amounts of two different liquids, using a hose squeeze pump, whereby the pump, rotating in one direction, sucks in the first liquid and then, rotating in the reverse direction, expels the liquid and at the same time sucks in the second liquid. The amounts metered are those that are customary when carrying out volume-dependent reactions during analyses, such as when titrating.

For example, when previously analyzing fluids, according to the discontinuous method, the liquid to be analyzed and the reagent were led from separate pipettes or burettes to the reaction vessel. In this way there was avoided any mixing of the two liquids and thus any contamination of the next metering. When metering of this kind is carried out by hand, double the time is required and two separate metering devices must be used. When this sort of metering is done semiautomatically or completely automatically, as with automatic analysers and titrators, a separate metering device is required for each liquid. This leads to a bulkier apparatus, greater cost, and to an undesired complexity of the control device.

Semiautomatic and completely automatic meterers using a three-way valve are also known in the prior art. In one position of the valve, one of the liquids is sucked up, and in another position the second liquid is released. This metering scheme requires at least one suction pump, since the second liquid can be discharged using the hydrostatic pressure. The multiway valve necessary for thsi method is susceptible to trouble when hand, or particularly when mechanically, operated.

There have been very recently introduced a method and an apparatus using a piston pump with a very long hose. In operation, most of the hose is filled with the first liquid and then by a suitable stroke of the piston a metered amount of the second liquid is sucked up. By reversing the stroke, the second liquid is first discharged and next a metered amount, dependent on the length of the piston stroke, of the first liquid held in the hose is discharged. This method and apparatus does enable a very precise metering, but the hose must be refilled when it is emptied of all of the first liquid that it contained. The apparatus is not suitable for carrying out a continuous automatic metering method.

It has been repeatedly suggested that hose squeeze pumps should be used in metering applications, but all attempts proved fruitless in trying to make the amount of liquid metered dependent on the running time of the pump cam. Even very small changes in the position along the hose length at which the cam squeezes the hose causes volumetric changes of 10 to 20% in the amount of liquid metered. The greater the internal diameter of the hose, the greater are the volumetric changes.

A further disadvantage of this method is that hose squeeze pumps hitherto commercially available drive the cam in only one direction.

SUMMARY OF THE INVENTION

The purpose of the invention is to produce a method that does not have the previously described disadvantages.

Accordingly, an object of the invention is a continuous method for metering liquids in dependence on the number of complete rotations of the hose squeeze pump.

This object and others of the invention will be apparent from the following detailed description.

BRIEF DESCRIPTION OF THE DRAWING

The invention will be described, with reference to the figure of the accompanying drawing, wherein the figure shows the method of the invention used in the laboratory.

DESCRIPTION OF THE PREFERRED EMBODIMENTS

The delivery of a pump is commonly denoted by the volume delivered in a given time interval. Accordingly, the desired amount is delivered when, speaking very generally, the pump is operated for a time computed on the basis of its delivery figure.

When metering in the laboratory, above all when carrying out analytical reactions, it is simply impossible to obtain a precise and always reproducible meterng by controlling the operating time of the hose squeeze pump. The reason for this arises from the fact that, when the pump is stopped after a given time, the cam of the pump rotor, which contacts the hose, does not necessarily always come to a stop at exactly the same point in its rotation. Since the hose, which is squeezed along a definite part of its length by the cam, is filled with liquid that is expelled from in front of the cam and sucked up behind the cam, any variation in the position of the stopped cam changes the amount of liquid delivered during each operating period. This change is dependent on the internal diameter of the hose, and increases with increasing internal diameter.

The method of the invention completely avoids this shortcoming by providing metered amounts in dependence on the number of revolutions of the pump rotor. The decisive feature of the invention is that the metering is regulated by precisely controlling the number of complete revolutions. Fractions of a revolution or inexact control of the number of complete revolutions would necessarily lead to the same disadvantages that appear when metering in dependence on the length of the operating time, as previously described.

A further, and absolutely essential, feature of the method is that the same pump used to suck up a precise quantity of the first liquid, and to discharge it, also sucks up the second liquid and discharges a precise quantity of it. This requires that the pump rotor is alternately reversed in direction, a manner of operation that is not common with hose squeeze pumps.

The intermittent operation of the hose squeeze pump, the reversing of the rotor, and the control of the number of rotor revolutions can be carried out by any suitable and known means.

In an advantageous embodiment of the invention, the pump is driven by an electric motor which is reversed by reversing polarity, the polarity reversal, intermittent operation, and the number of revolutions all being controlled electronically by known means.

The pump can also be reversed by gears, and the control for intermittent operation and the number of revolutions coupled to the pump electromagnetically or mechanically. In this case, the control itself can be electronic, or mechanical, using cams, for example.

The method of the invention will now be described by way of an example.

EXAMPLE

A hose squeeze pump 1 is continuously connected by a hose 2 to a supply container 3 for the second liquid 4. The supply container is closed and incorporates a vent 5. The pump rotor 6 so moves the cams 7 over a determined length of the hose 2 that the hose is sufficiently squeezed so as to separate completely the liquid in the hose at the point of contact between the hose and each cam. The movement of the cams causes a pressure in front of the cams and a suction behind them. The use of two cams is desirable in order to avoid backup of the liquid, because with only one cam the hose is not squeezed over the complete rotation of the rotor.

The pump is rotated counterclockwise (by drive means not shown) until the hose 2 is filled with the solution 4 up its free discharge end 8. Since the cams 7 squeeze the hose shut, the solution 4 contained in the hose between the pump 1 and the end 8 cannot discharge. After the pump is stopped, the free hose end is submerged in the first liquid 10 to be metered, held in the container 9. The pump is now turned in the opposite direction (clockwise) until the desired volume of the first liquid is sucked into the hose. This volume is freely determined by varying the number of rotations of the pump rotor 6. After the pump is again stopped, the hose end 8 is put into another container 11. The pump rotor is again reversed in direction (counterclockwise) and turned through as many revolutions as it was when sucking up the first liquid 10, so that the entire quantity of liquid 10 contained in the hose is forced into the container 11. By continuing to drive the pump rotor in the same direction, a desired volume of the second liquid 4 is expelled into the container 11; the volume expelled can be varied as desired in accordance with the number of turns of the pump rotor. The second liquid at the same time is being sucked out of its container 3, so that when the dosing operation is finished and the pump is stopped, the hose is filled up to its end 8 with the second liquid.

By discharging a determined amount of the second liquid 4, any remainder in the hose of the first liquid 10 is necessarily washed out of the hose, so that it cannot contaminate the next dosing operation.

Possible contamination of the outer surface of the tube can be avoided by known methods, such as by treating the surface so as to prevent liquid from clinging to it, or by using a suitable wiping device.

The hose end 8 can be moved between the containers 10 and 11 by any suitable mechanical arrangement, such as that schematically shown in the figure.

Although the preferred form of the invention has been described, the scope of, and the breadth of protection afforded to, the invention are limited solely by the appended claims.

What is claimed is:

1. Method for continuously and automatically providing precisely metered amounts of two different liquids by means of a single hose squeeze pump having a single hose, including the steps of rotating the pump in one direction a predetermined number of complete revolutions to suck up a predetermined, precise quantity of the first liquid into the hose through its first end; rotating the pump in the reverse direction exactly the same number of whole revolutions as in the previous step to discharge from the first hose end all of the liquid held in the hose while sucking up the second liquid at the second hose end; and then continuing to rotate the pump in the same direction a predetermined number of complete revolutions to discharge from the first hose end a predetermined, precise quantity of the second liquid.

2. The method as defined in claim 1, including the step, before said step of sucking up the first liquid, of rotating the pump in the reverse direction to suck up a sufficient quantity of the second liquid through the second hose end until the hose is filled up to its first end and stopping the pump at a point at which it squeezes the hose.

References Cited

UNITED STATES PATENTS 2,471,623   5/1949   Hubbell.
3,055,551   9/1962   Johnson _____ 222—63

DAVID M. BOCKENEK, Primary Examiner

U.S. Cl. X.R.

222—136